(12) United States Patent
Bloom et al.

(10) Patent No.: US 11,200,574 B2
(45) Date of Patent: Dec. 14, 2021

(54) SECURE MODE FOR ELECTRONIC ACCESS CONTROL READERS

(71) Applicant: Schlage Lock Company LLC, Indianapolis, IN (US)

(72) Inventors: Andreas Anton Bloom, Erlangen (DE); Frank Maurer, Aldingen (DE)

(73) Assignee: Schlage Lock Company LLC, Carmel, IN (US)

( * ) Notice: Subject to any disclaimer, the term of this patent is extended or adjusted under 35 U.S.C. 154(b) by 1417 days.

(21) Appl. No.: 14/902,207

(22) PCT Filed: Jun. 30, 2014

(86) PCT No.: PCT/US2014/044972
§ 371 (c)(1),
(2) Date: Dec. 30, 2015

(87) PCT Pub. No.: WO2015/002909
PCT Pub. Date: Jan. 8, 2015

(65) Prior Publication Data
US 2016/0371696 A1    Dec. 22, 2016

Related U.S. Application Data

(60) Provisional application No. 61/841,385, filed on Jun. 30, 2013.

(51) Int. Cl.
*G06K 7/00* (2006.01)
*H04L 29/06* (2006.01)
(Continued)

(52) U.S. Cl.
CPC ....... *G06Q 20/4014* (2013.01); *G06K 7/0091* (2013.01); *G06K 7/10257* (2013.01);
(Continued)

(58) Field of Classification Search
None
See application file for complete search history.

(56) References Cited

U.S. PATENT DOCUMENTS 5,828,043 A    10/1998   Nicoll et al.
6,422,475 B1    7/2002   May
(Continued)

FOREIGN PATENT DOCUMENTS

GB    2421300 A    6/2006
WO    2006096548 A2    9/2006
(Continued)

OTHER PUBLICATIONS

Werriam-Webster, Some _ Definition, https://web.archive.org/web/20151220144139/https://www.merriam-webster.com/dictionary/some. Accessed on Aug. 11, 2020 (Year: 2015).*
(Continued)

*Primary Examiner* — Neha Patel
*Assistant Examiner* — Gabriel Mercado
(74) *Attorney, Agent, or Firm* — Taft Stettinius & Hollister LLP

(57) ABSTRACT

An electronic reader may operate in a normal mode. The reader may evaluate criteria to determine whether to continue operating in the normal mode or operate in a secure mode. The secure mode may include deactivating functionality in the reader. Deactivating functionality may include at least one of disabling a credential reading functionality, disabling a credential processing functionality, and disabling a credential communicating functionality.

3 Claims, 4 Drawing Sheets

(51) Int. Cl.
*G06Q 20/40* (2012.01)
*G06K 7/10* (2006.01)
*G06Q 20/10* (2012.01)
*G06Q 20/32* (2012.01)

(52) U.S. Cl.
CPC ......... *G06Q 20/10* (2013.01); *G06Q 20/3223* (2013.01); *H04L 63/10* (2013.01)

(56) References Cited

U.S. PATENT DOCUMENTS

| | | | |
|---|---|---|---|
| 6,570,610 | B1 | 5/2003 | Kipust |
| 6,629,643 | B1 | 10/2003 | Nagata et al. |
| 7,069,755 | B2 | 7/2006 | Lies et al. |
| 8,167,203 | B2 | 5/2012 | Hemmer et al. |
| 8,258,918 | B1 | 9/2012 | Diorio et al. |
| 2002/0170802 | A1* | 11/2002 | Cantacuzene ...... G07C 9/00039 194/212 |
| 2007/0001002 | A1* | 1/2007 | Ponert ................ G07C 9/00111 235/382 |
| 2007/0034691 | A1* | 2/2007 | Davis ................ G06Q 20/3278 235/382 |
| 2007/0039041 | A1 | 2/2007 | Davis |
| 2007/0057057 | A1 | 3/2007 | Andresky et al. |
| 2007/0263596 | A1* | 11/2007 | Charrat ................. H04L 45/00 370/351 |
| 2008/0094220 | A1 | 4/2008 | Foley et al. |
| 2008/0169350 | A1 | 7/2008 | Audebert et al. |
| 2008/0185435 | A1 | 8/2008 | Hopt |
| 2008/0231449 | A1 | 9/2008 | Moshfeghi |
| 2010/0039220 | A1* | 2/2010 | Davis ..................... G06F 21/31 340/5.52 |
| 2010/0133336 | A1 | 3/2010 | Bailey |
| 2011/0226849 | A1* | 9/2011 | Padilla ................. G06K 7/0004 235/375 |
| 2013/0119130 | A1* | 5/2013 | Braams ................. G06K 7/042 235/382 |
| 2016/0371696 | A1* | 12/2016 | Bloom ................ G06K 7/0091 |

FOREIGN PATENT DOCUMENTS

| | | | |
|---|---|---|---|
| WO | 2012125897 | A2 | 9/2012 |
| WO | 2013009301 | A1 | 1/2013 |
| WO | WO-2013009301 | A1 * | 1/2013 ......... G07C 9/00031 |

OTHER PUBLICATIONS

International Search Report; International Search Authority; International PCT Application No. PCT/US2014/044972; dated Oct. 30, 2014; 2 pages.
Mexican Office Action; Mexican Institute of the Industrial Property; Mexican Application No. MX/a/2016/000232; dated Apr. 11, 2018; 3 pages.
Supplementary European Search Report; European Patent Office; European Application No. 14819983.9; dated Jul. 13, 2017; 8 pages.
European Examination Report; European Patent Office; European Application No. 14819983.9; dated Sep. 5, 2018; 3 pages.
European Examination Report (2nd); European Patent Office; European Application No. 14819983.9; dated Feb. 26, 2019; 3 pages.

* cited by examiner

SECURE MODE FOR ELECTRONIC ACCESS CONTROL READERS

CROSS-REFERENCE TO RELATED APPLICATIONS

The present application is a U.S. National Phase of International PCT Application No. PCT/US2014/044972 filed on Jun. 30, 2014, which claims the benefit of U.S. Provisional Patent Application No. 61/841,385 filed on Jun. 30, 2013, the contents of each application hereby incorporated by reference in their entirety.

BACKGROUND

The present application generally relates to readers and in particular, a secure mode for a reader. Electronic readers may be structured to operate in various modes. Some existing systems have various shortcomings relative to certain applications. Accordingly, there remains an interest for further contributions in this area of technology.

SUMMARY

One embodiment of the present invention is a unique electronic reader that may operate in a secure mode. Other embodiments include apparatuses, systems, devices, hardware, methods, and combinations for a secure mode for electronic access control readers. Further embodiments, forms, features, aspects, benefits, and advantages of the present application shall become apparent from the description and figures provided herewith.

BRIEF DESCRIPTION OF THE FIGURES

The description herein makes reference to the accompanying figures wherein like reference numerals refer to like parts throughout the several views, and wherein.

DETAILED DESCRIPTION OF REPRESENTATIVE EMBODIMENTS

Figure 1:
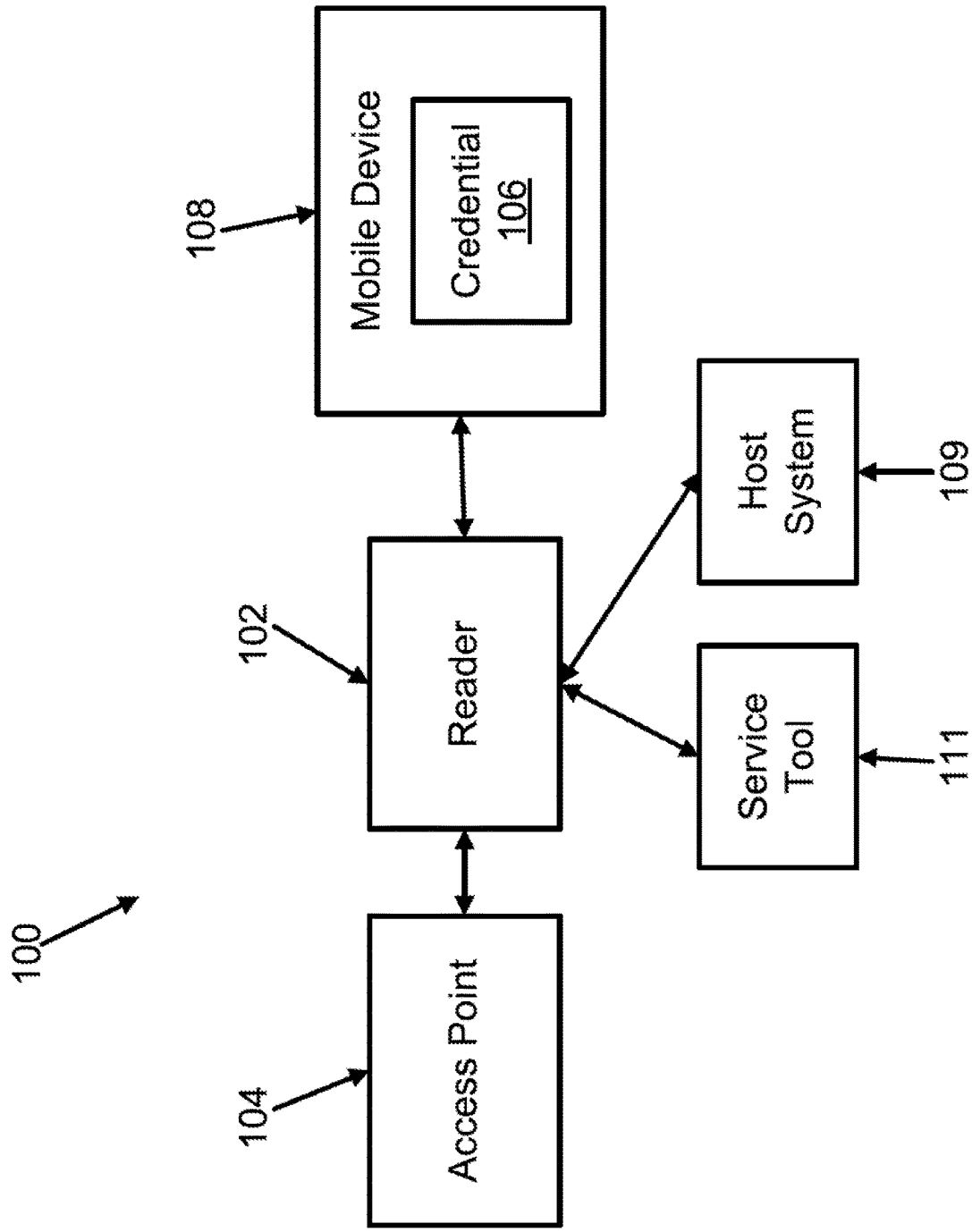
FIG. 1 is a schematic block diagram of an exemplary system.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one ordinarily skilled in the art to which the invention relates.

FIG. 1 illustrates a schematic block diagram of an exemplary system 100. In the embodiment shown in FIG. 1, the system 100 is an access control system. However, the system 100 may also be a payment system, a transit system, a vending system, or the like. The system 100 includes a reader 102 located on or near an access point 104 (e.g., a door, a vending machine, a payment terminal, etc.). The reader 102 is structured to receive a token or credential 106 from a mobile device 108 and/or via a user input such as a keypad (not shown). In some embodiments, the reader 102 will make a decision based on the credential 106 (e.g., whether to unlock a door). In other embodiments, the reader 102 will transmit the credential 106 to a host system 109 (e.g., an access control panel, a server, and/or a cloud service) to make a decision based on the credential 106. In embodiments in which the reader 102 is part of an access control system, the reader 102 may include a lock (not shown), such as a deadbolt or latch, that the reader 102 may actuate to control access to the access point 104 (e.g., a door).

The host system 109 may communicate with the reader 102 via a wired and/or wireless connection such as a TCP/IP connection and/or other connection(s) using another protocol. In addition, as explained in more detail with respect to FIG. 3, the host system 109 may send commands and/or settings to the reader 102 related to a secure operating mode. The system 100 may also include a service tool 111, such as a handheld computing device, that communicates with the reader 102 to provide commands and/or settings to the reader 102 related to a secure operating mode. It is contemplated that in some embodiments, the mobile device 108 may provide commands and/or settings to the reader 102.

The credential 106 generally is any unique identifier that is used by the reader 102 and/or the host system 109 to determine whether to allow a transaction such as an access control request, a payment transaction, a vending transaction, or the like. Generally, the credential 106 is a string of bits of fixed length. The length of the credential 106 depends on the type or format of the credential. The mobile device 108 may be a proximity card, a smartcard, a contactless smartcard, a key fob, a mobile phone, such as a cell phone or smartphone, a tablet computer, such as an iPad, or any other type of mobile computing device that is capable of transmitting a credential 106 to the reader 102.

Figure 2:
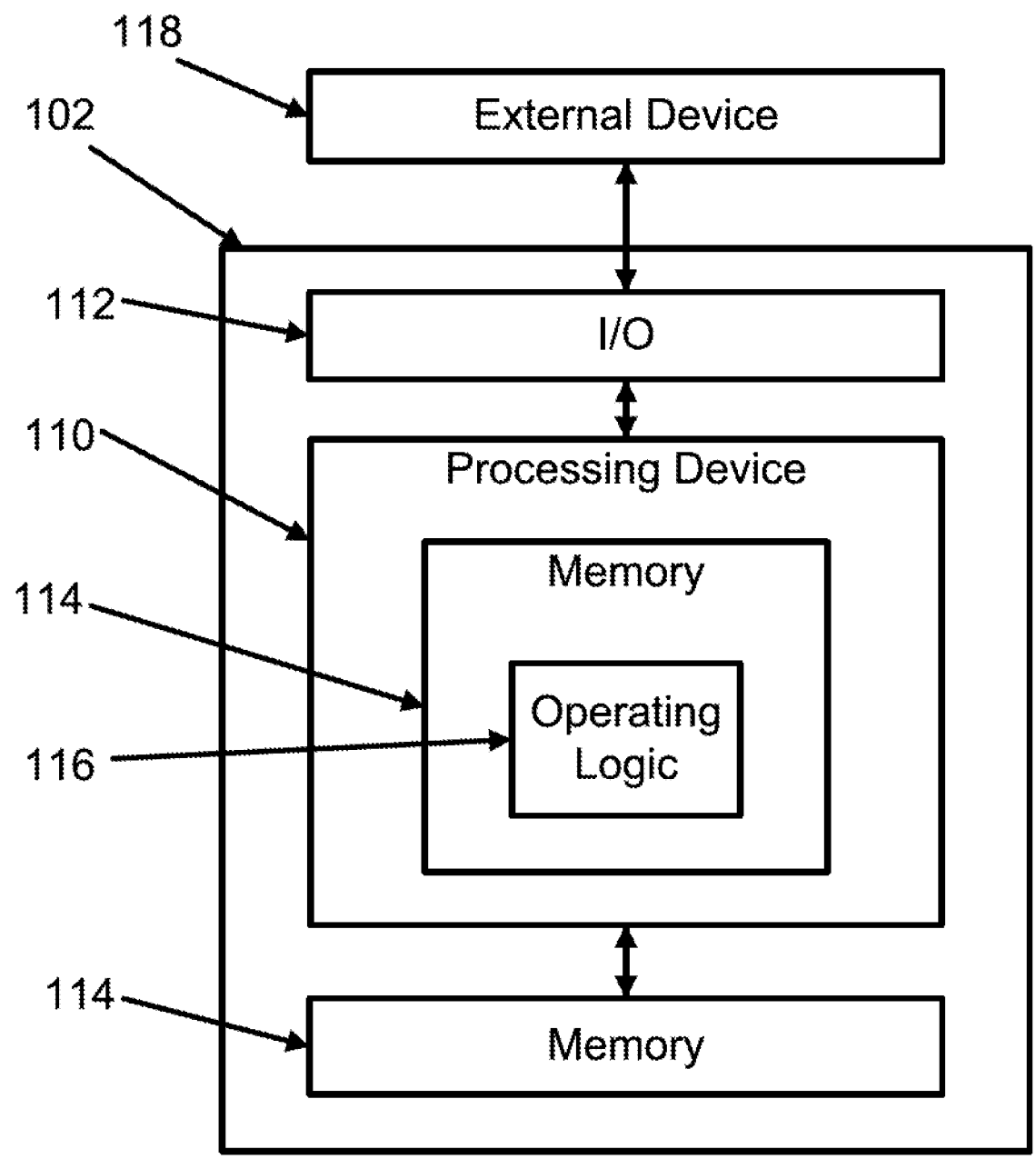
FIG. 2 is a schematic block diagram of an exemplary reader.

FIG. 2 is a schematic block diagram of the reader 102. Reader 102 includes a processing device 110, an input/output device 112, memory 114, and operating logic 116. Furthermore, reader 102 communicates with one or more external devices 118, e.g., mobile device 108 to receive the credential 106, host system 109 to transfer the credential and/or receive commands and/or settings, and/or service tool 111 to receive commands and/or settings.

The input/output device 112 may be any type of device that allows the reader 102 to communicate with the external device 118 or a user. For example, the input/output device 112 may be a card reading unit, transceiver, network adapter, network card, interface, keypad, or a port (e.g., a USB port, serial port, parallel port, an analog port, a digital port, VGA, DVI, HDMI, FireWire, CAT 5, or any other type of port or interface). The input/output device 112 may be comprised of hardware, software, firmware, and/or state machines. It is contemplated that the input/output device 112 may include more than one type of card reading unit, keypad, transceiver, network adapter, network card, and/or port. It is contemplated that the keypad or card reading unit may be an external device that plugs into the reader 102.

The external device 118 may be any type of device that allows data to be inputted to or outputted from the reader 102. For example, the external device 118 may be a card reading unit, keypad, mobile device 108, host system 109, an accessory, equipment, a handheld computer, a service tool 111, a diagnostic tool, a controller, a computer, a server, a processing system, a sensor, a printer, a display, an alarm, an illuminated indicator such as a status indicator, a keyboard, a mouse, or a touch screen display. Furthermore, it is contemplated that the external device 118 may be integrated into the reader 102. It is further contemplated that there may be more than one external device in communication with the reader 102. The mobile device 108, the host system 109, and the service tool 111 are examples of an external device 118.

Processing device 110 can be a programmable type, a dedicated, hardwired state machine; or a combination of these; and it can further include multiple processors, Arithmetic-Logic Units (ALUs), Central Processing Units (CPUs), Digital Signal Processors (DSPs), or the like. Processing devices 110 with multiple processing units may utilize distributed, pipelined, and/or parallel processing. Processing device 110 may be dedicated to performance of just the operations described herein or may be utilized in one or more additional applications. In the depicted form, processing device 110 is of a programmable variety that executes algorithms and processes data in accordance with operating logic 116 as defined by programming instructions (such as software or firmware) stored in memory 114. Alternatively or additionally, operating logic 116 for processing device 110 is at least partially defined by hardwired logic or other hardware. Processing device 110 can be comprised of one or more components of any type suitable to process the signals received from input/output device 112 or elsewhere, and provide desired output signals. Such components may include digital circuitry, analog circuitry, or a combination of both.

Memory 114 may be of one or more types, such as a solid-state variety, electromagnetic variety, optical variety, or a combination of these forms. Furthermore, memory 114 can be volatile, nonvolatile, or a mixture of these types, and some or all of memory 114 can be of a portable variety, such as a disk, tape, memory stick, cartridge, or the like. In addition, memory 114 can store data that is manipulated by the operating logic 116 of processing device 110, such as data representative of signals received from and/or sent to input/output device 112 in addition to or in lieu of storing programming instructions defining operating logic 116, just to name one example. As shown in FIG. 2, memory 114 may be included with processing device 110 and/or coupled to the processing device 110.

Figure 3:
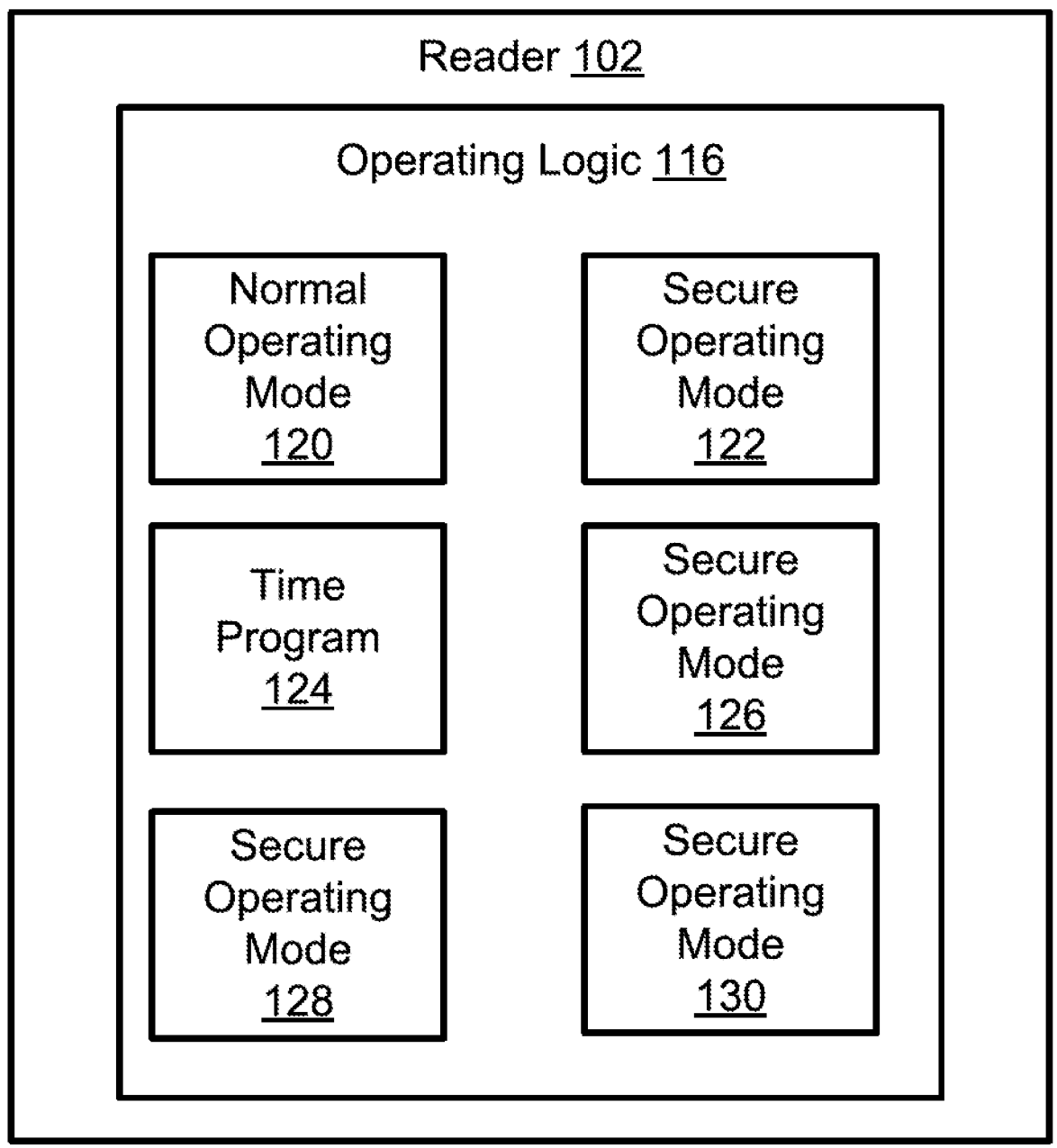
FIG. 3 is a schematic block diagram of an exemplary reader.

FIG. 3 is schematic block diagram of the reader 102 including various modes of operation that may be part of operating logic 116. The modes of operation may provide a number of functionalities. A mode may be implemented as operations by software, hardware, artificial intelligence, fuzzy logic, or any combination thereof, or at least partially performed by a user or operator. In certain embodiments, modes represent software elements as a computer program encoded on a computer readable storage medium, wherein a computer performs the described operations when executing the computer program. A mode may be a single device, distributed across devices, and/or a mode may be grouped in whole or in part with other modes or devices. The operations of any mode may be performed wholly or partially in hardware/software or by other modes. The presented organization of the modes is exemplary only, and other organizations, configurations and arrangements are contemplated.

The reader 102 may include a normal operating mode 120 in which typically most or all of the functionalities of the reader 102 are activated. The reader 102 may include one or more secure operating modes 122, 126, 128, 130 in which all of the functionality of the reader 102 remains active except for one or more functions that are disabled or deactivated.

The reader 102 may include a secure operating mode 122 in which the credential reading capability in the reader 102 is deactivated. For example, a card reading unit or a keypad may be disabled in the reader 102 during certain times and/or on certain days as controlled by a time program 124 in operating logic 116, or in response to a command or setting from host system 109, service tool 111, and/or mobile device 108. The time program 124 may indicate to the reader 102 when certain functions should be deactivated based on settings received from the host system 109 and/or service tool 111. When the reader 102 is in the secure operating mode 122, the reader 102 cannot read any credential 106.

The reader 102 may include a secure operating mode 126 in which the credential processing functionality is disabled during certain times and/or on certain days. In the secure operating mode 126, the reader 102 may still be able to read or receive the credential 106 from the mobile device 108 or a keypad, but the reader 102 cannot process the credential 106 such as to determine whether the credential 106 is valid and/or whether access to the access point 104 should be granted.

The reader 102 may include a secure operating mode 128 in which the credential communication functionality is disabled during certain times and/or on certain days. In the secure operating mode 128, the reader 102 may still be able to read the credential 106 from the mobile device 108, but the reader 102 cannot communicate the credential 106 to the host system 109 so that the host system 109 can process the credential 106 such as to determine whether the credential 106 is valid and/or whether access to the access point 104 should be granted.

The reader 102 may include a secure operating mode 130 in which any combination of the three secure operating modes 122, 126, and 128 are utilized. For example, in secure operating mode 130, the credential reading capability, the credential processing capability, and the credential communication capability are all disabled or deactivated. It is contemplated that the secure modes 122, 126, and/or 128 may be active at different times and/or on different days.

The secure operation modes 122, 126, 128, 130 may improve the security of the system 100 during the times and/or days when certain functionalities in the reader 102 are deactivated. For example, on days and/or at times when no one is allowed to use the access point 104 at all, the credential reading, processing, and/or communicating functions of the reader 102 are disabled. For example, certain functions in the reader 102 may be deactivated from 8:00 pm to 6:00 am on weekdays and/or be deactivated all day on Saturdays and Sundays. All other functionality, e.g., monitoring of door contacts or tamper switches, remain active. Because the credential reading, processing, and/or communicating functions are deactivated, an unauthorized person cannot gain access to the access point 104, e.g., by hacking the reader 102 and/or spoofing a credential 106.

Figure 4:
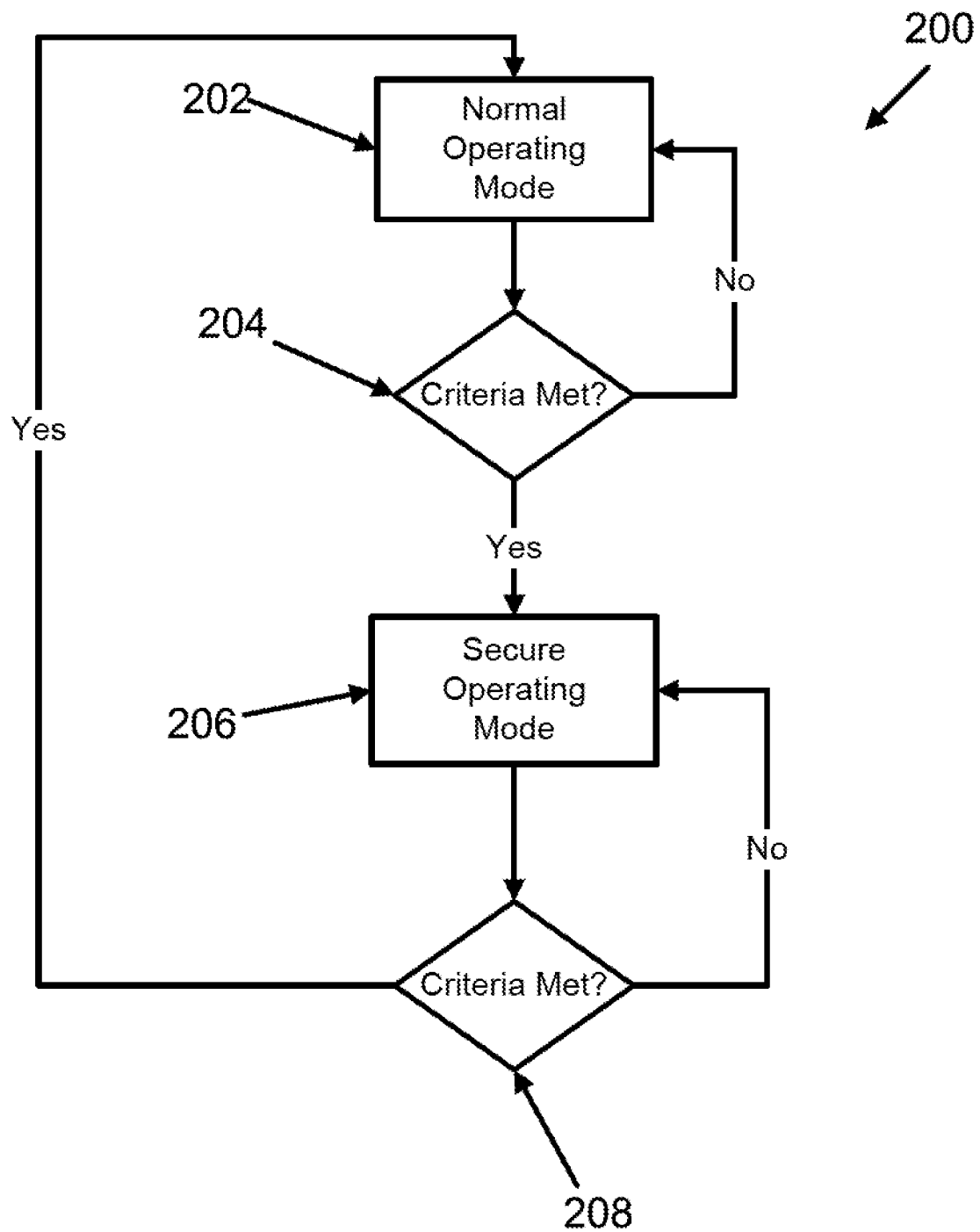
FIG. 4 is a schematic flow diagram of an exemplary process for operating a reader.

FIG. 4 illustrates a schematic flow diagram of an exemplary process 200 for operating a reader 102 in a secure operating mode. Operations illustrated for all of the processes in the present application are understood to be examples only, and operations may be combined or divided, and added or removed, as well as re-ordered in whole or in part, unless explicitly stated to the contrary.

Process 200 begins at operation 202 in which the reader 102 is operating in the normal operating mode 120. Generally, most or all of the functionality of the reader 102 is activated in the normal operating mode 120.

Process 200 then proceeds from operation 202 to operation 204. At operation 204, the reader 102 determines whether the criteria for entering a secure operating mode 122, 126, 128, 130 have been met. For example, the reader 102 may utilize time program 124 to determine whether it is a particular time and/or day that indicates the reader 102 should be operating in a secure operating mode 122, 126, 128, 130. Or, the reader 102 may determine whether it has received a command and/or setting from the host system 109, service tool 111, and/or mobile device 108 indicating that the reader 102 should be operating in a secure operating mode 122, 126, 128, 130. If the reader 102 determines that the criteria for entering a secure operating mode have not been met, then reader 102 continues to operate in the normal operating mode 120. If the reader 102 determines that the criteria for entering a secure operating mode have been met, then the reader 102 enters a secure operating mode 122, 126, 128, 130.

Process 200 then proceeds from operation 204 to operation 206. At operation 206, the reader 102 operates in one or more of the secure operating modes 122, 126, 128, 130 as discussed above. Generally, one or more functions of the reader 102 are deactivated during operation in a secure operating mode.

Process 200 then proceeds from operation 206 to operation 208. At operation 208, the reader 102 determines whether the criteria for returning to the normal operating mode 120 have been met. For example, the reader 102 may utilize time program 124 to determine whether it is a particular time and/or day that indicates the reader 102 should be operating in the normal operating mode 120. Or, the reader 102 may determine whether the reader 102 has received a command and/or setting from the host system 109 and/or service tool 111 indicating that the reader 102 should be operating in the normal operating mode 120. If the reader 102 determines that the criteria for returning to the normal operating mode 120 have not been met, then reader 102 continues to operate in one or more of the secure operating modes 122, 126, 128, 130. If the reader 102 determines that the criteria for returning to the normal operating mode 120 have been met, then the reader 102 returns to the normal operating mode 120.

The various aspects of the process 200 in the present application may be implemented in operating logic 116 as operations by software, hardware, artificial intelligence, fuzzy logic, or any combination thereof, or at least partially performed by a user or operator. In certain embodiments, operations represent software elements as a computer program encoded on a computer readable medium, wherein the reader 102 performs at least some of the described operations when executing the computer program.

One aspect of the present application includes a method, comprising: operating a reader in a normal mode; analyzing, with the reader, criteria to determine whether to operate the reader in a secure mode; and in response to analyzing the criteria, operating the reader in the secure mode, wherein the secure mode includes deactivating functionality in the reader.

Features of the aspect may include: wherein deactivating functionality includes at least one of disabling credential reading functionality, disabling credential processing functionality, and disabling credential communicating functionality; wherein the criteria includes at least one of a time of day, a day of week, a holiday, a command, and a setting; transmitting at least one of the command and the setting from a host system to the reader; transmitting at least one of the command and the setting from a handheld device to the reader; returning to operating the reader in the normal mode when the criteria are no longer satisfied; wherein the reader is an access control reader; wherein the reader is a payment reader.

Another aspect of the present application may include: an electronic reader, comprising: a credential processing system structured to receive a credential from a mobile device and process the credential; and a processing device coupled to the credential processing system, wherein the processing device is structured to: operate in a normal mode; evaluate parameters to determine whether to operate in a secure mode; and operate the reader in the secure mode, wherein the secure mode includes disabling at least a portion of the credential processing system.

Features of the aspect of the present application may include: wherein disabling at least a portion of the credential processing system includes at least one of deactivating credential reading functionality, deactivating credential processing functionality, and deactivating credential communicating functionality; wherein the parameters include at least one of a time of day, a day of week, a holiday, and a command; wherein the reader is an electronic access control reader; a locking mechanism including one of a deadbolt and a latch structured to be operated by the processing device when a valid credential is presented; a host system structured to receive the credential from the credential processing system of the reader, determine whether to grant an access request based on the credential, and transmit an access decision to the reader; wherein the reader is a payment reader.

Yet another aspect of the present application may include a system, comprising: an electronic reader including a processing coupled to a credential processing system, wherein the credential processing system is structured to receive a credential from a mobile device and process the credential, and wherein the processing device is structured to: operate in a normal mode; evaluate parameters to determine whether to operate in a secure mode; and operate the reader in the secure mode, wherein the secure mode includes disabling at least a portion of the credential processing system; and a host system structured to receive the credential from the credential processing system of the reader, determine whether to perform an action based on the credential, and transmit a decision to the reader.

Features of the aspect may include: wherein disabling at least a portion of the credential processing system includes at least one of deactivating credential reading functionality, deactivating credential processing functionality, and deactivating credential communicating functionality; wherein the parameters include at least one of a time of day, a day of week, a holiday, and a command; a locking mechanism including one of a deadbolt and a latch structured to be operated by the processing device based on the decision received by the reader; wherein the electronic reader is a payment reader.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention. When the language "at least a portion" and/or "a portion" is used the item can include a portion and/or the entire item unless specifically stated to the contrary.

The invention claimed is:

1. A method of operating a reader device associated with a physical access point in an access control system, the method comprising:

operating the reader device in a normal mode in which at least a credential reading functionality of the reader device and a credential processing functionality of the reader device, different from the credential reading functionality, are activated, wherein the reader device is able to receive a credential from a mobile device when the credential reading functionality is activated and unable to receive the credential from the mobile device when the credential reading functionality is deactivated, and wherein the reader device is able to analyze the credential to determine whether the credential is valid when the credential processing functionality is activated and unable to analyze the credential to determine whether the credential is valid when the credential processing functionality is deactivated;

analyzing, with the reader device, criteria to determine whether to operate the reader device in a secure mode selected from a plurality of secure modes, wherein the criteria include at least one of a time of day, a day of week, a holiday, a command, and a setting, and wherein the plurality of secure modes includes at least a first secure mode in which the credential reading functionality is deactivated and a second secure mode, different from the first secure mode, in which the credential processing functionality is deactivated;

operating the reader device in the secure mode selected from the plurality of secure modes in response to determining that the criteria indicate to operate the reader device in the secure mode;

and returning operation of the reader device from the secure mode to the normal mode in response to determining the criteria to operate the reader device in the secure mode are no longer satisfied.

2. An electronic reader in an access control system, associated with a physical access point, and capable of operating in a normal mode and a plurality of secure modes, the electronic reader comprising:

a processing device;

and a memory having a plurality of instructions stored thereon that, in response to execution by the processing device, causes the electronic reader to:

operate the electronic reader in a normal mode in which at least a credential reading functionality of the electronic reader and a credential processing functionality of the electronic reader, different from the credential reading functionality, are enabled, wherein the electronic reader is able to receive a credential from a mobile device when the credential reading functionality is enabled and unable to receive the credential from the mobile device when the credential reading functionality is disabled, and wherein the electronic reader is able to analyze the credential to determine whether the credential is valid when the credential processing functionality is enabled and unable to analyze the credential to determine whether the credential is valid when the credential processing functionality is disabled;

evaluate parameters to determine whether to operate the electronic reader in a secure mode selected from the plurality of secure modes, wherein the parameters include at least one of a time of day, a day of week, a holiday, and a command, and wherein the plurality of secure modes includes at least a first secure mode in which the credential reading functionality is disabled and a second secure mode, different from the first secure mode, in which the credential processing functionality is disabled;

operate the electronic reader in the secure mode in response to a determination that the parameters indicate to operate the electronic reader in the secure mode;

and return operation of the electronic reader from the secure mode to the normal mode in response to a determination that the parameters no longer indicate to operate the reader device in the secure mode.

3. An access control system for controlling access through a physical access point, the access control system comprising:

a host server;

and an electronic reader including a processing device and a memory having a plurality of instructions stored thereon that, in response to execution by the processing device, causes the electronic reader to:

operate the electronic reader in a normal mode in which at least a credential reading functionality of the electronic reader and a credential communication functionality of the electronic reader, different from the credential reading functionality, are enabled, wherein the electronic reader is able to receive a credential from a mobile device when the credential reading functionality is enabled and unable to receive the credential from the mobile device when the credential reading functionality is disabled, and wherein the reader device is able to communicate the credential to the host server when the credential communication functionality is enabled and unable to communicate the credential to the host server when the credential communication functionality is disabled;

evaluate parameters to determine whether to operate the electronic reader in a secure mode selected from a plurality of secure modes, wherein the parameters include at least one of a time of day, a day of week, a holiday, and a command, and wherein the plurality of secure modes includes at least a first secure mode in which the credential reading functionality is disabled and a second secure mode, different from the first secure mode, in which the credential communication functionality is disabled;

operate the electronic reader in the secure mode selected from the plurality of secure modes in response to a determination that the parameters indicate to operate the electronic reader in the secure mode;

and return operation of the electronic reader from the secure mode to the normal mode in response to a determination that the parameters no longer indicate to operate the electronic reader in the secure mode;

and wherein the host server is structured to receive the credential from the electronic reader when the electronic reader is in the normal mode, determine whether to perform an action based on the received credential, and transmit a decision to the electronic reader based on the determination whether to perform the action.

* * * * *